(12) United States Patent
Weisbrod et al.

(10) Patent No.: US 10,210,764 B2
(45) Date of Patent: Feb. 19, 2019

(54) AERIAL RADIO FREQUENCY (RF) MANAGEMENT

(71) Applicant: Verizon Patent and Licensing Inc., Basking Ridge, NJ (US)

(72) Inventors: Fred Weisbrod, Renton, WA (US); Joshua J. Crans, Bothell, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/644,160

(22) Filed: Jul. 7, 2017

(65) Prior Publication Data

US 2019/0012923 A1 Jan. 10, 2019

(51) Int. Cl.
| | | |
|---|---|---|
| G05D 1/00 | (2006.01) | |
| G05D 1/10 | (2006.01) | |
| G08G 5/00 | (2006.01) | |
| B64C 39/02 | (2006.01) | |
| G01S 19/46 | (2010.01) | |
| H04W 72/08 | (2009.01) | |
| H04W 88/08 | (2009.01) | |

(52) U.S. Cl.
CPC .......... *G08G 5/0026* (2013.01); *G01S 19/46* (2013.01); *G05D 1/0022* (2013.01); *G05D 1/101* (2013.01); *G08G 5/0013* (2013.01); *H04W 72/085* (2013.01); *B64C 39/024* (2013.01); *B64C 2201/141* (2013.01); *H04W 88/08* (2013.01)

(58) Field of Classification Search
USPC .......................................................... 701/2
See application file for complete search history.

(56) References Cited

U.S. PATENT DOCUMENTS

| | | | | |
|---|---|---|---|---|
| 8,467,733 | B2 * | 6/2013 | Leabman | H01Q 1/246 455/431 |
| 9,621,850 | B1 * | 4/2017 | Mitchell | H04N 7/15 |
| 9,641,964 | B2 * | 5/2017 | Kulkarni | H01Q 1/24 |
| 9,793,977 | B2 * | 10/2017 | Chang | H04B 7/18506 |
| 9,797,978 | B1 * | 10/2017 | Melamed | G01S 3/14 |
| 9,832,754 | B1 * | 11/2017 | Akkarakaran | H04B 7/0617 |
| 9,847,035 | B1 * | 12/2017 | Melamed | H04B 17/391 |
| 2012/0302160 | A1 * | 11/2012 | Silny | H04B 7/18508 455/12.1 |

(Continued)

FOREIGN PATENT DOCUMENTS

EP 2938117 B1 * 12/2017

OTHER PUBLICATIONS

Google machine translation of EP 2938117 b1 (Feb. 2, 2018).*

*Primary Examiner* — Jean Paul Cass (57) ABSTRACT

A device can receive, from an aerial vehicle, information related to the aerial vehicle. The information can be used by the device to manage use of an aerial RF signal by multiple aerial vehicles. The device can determine other information related to the aerial vehicle. The device can determine a base station, of a set of base stations, or a channel, of a set of channels associated with the base station, the aerial vehicle is to use to communicate. Each of the set of channels can have a different beam width. Different channels, of the set of channels, can be used by the aerial vehicle at different altitudes. The device can provide a set of instructions to the aerial vehicle to cause the aerial vehicle to use the base station or the channel to communicate. The device can perform an action other than providing the set of instructions.

20 Claims, 5 Drawing Sheets

(56) References Cited

U.S. PATENT DOCUMENTS

| | | | | |
|---|---|---|---|---|
| 2012/0314791 A1* | 12/2012 | Zhang | ............ | H04B 7/0617 |
| | | | | 375/267 |
| 2013/0253612 A1* | 9/2013 | Chow | ............ | A61N 1/3787 |
| | | | | 607/60 |
| 2016/0119770 A1* | 4/2016 | Ryu | ............ | H04W 8/005 |
| | | | | 370/328 |
| 2016/0142868 A1* | 5/2016 | Kulkarni | ............ | H01Q 1/24 |
| | | | | 455/456.5 |
| 2016/0270063 A1* | 9/2016 | Chen | ............ | H04W 74/0808 |
| 2016/0309339 A1* | 10/2016 | Priest | ............ | H04W 24/08 |
| 2017/0029107 A1* | 2/2017 | Emami | ............ | B64C 39/024 |
| 2017/0180939 A1* | 6/2017 | Kulkarni | ............ | H01Q 1/24 |
| 2017/0222712 A1* | 8/2017 | Chang | ............ | H04B 7/18506 |
| 2017/0251404 A1* | 8/2017 | Cummings | ............ | H04W 28/18 |
| 2017/0332359 A1* | 11/2017 | Tsai | ............ | H04B 7/0617 |
| 2017/0353960 A1* | 12/2017 | Heninwolf | ............ | H04B 7/0691 |
| 2017/0366311 A1* | 12/2017 | Iyer | ............ | H04B 7/0482 |
| 2017/0367120 A1* | 12/2017 | Murray | ............ | H04W 72/046 |
| 2018/0009526 A1* | 1/2018 | Spengler | ............ | B64C 39/024 |

\* cited by examiner

AERIAL RADIO FREQUENCY (RF) MANAGEMENT

BACKGROUND

In telecommunications, degradation can refer to the loss of quality of an electronic signal. Wireless signal degradation can be caused by a number of factors, including interference or overlap with other signals. This can result in a lower quality of services provided by devices that utilize wireless signals.

DETAILED DESCRIPTION OF PREFERRED EMBODIMENTS

The following detailed description of example implementations refers to the accompanying drawings. The same reference numbers in different drawings can identify the same or similar elements.

An aerial vehicle (e.g., an unmanned aerial vehicle, an aircraft, etc.) can use aerial radio frequency (RF) coverage for communications. The aerial vehicle can experience a degradation in signal quality (e.g., reduced signal-to-interference-plus-noise ratio (SINR)) due to RF signal overlap (e.g., that results from a lack of physical boundaries that contain RF signals, as in the case of terrestrial RF coverage). Signal degradation can cause reduced throughput, error-prone communications, lost connectivity, and/or the like for an aerial vehicle using aerial RF coverage.

Some implementations, described herein, provide a device that is capable of receiving information related to an aerial vehicle and available aerial RF signals and determining an aerial RF signal for the aerial vehicle to use to communicate based on the information related to the aerial vehicle and/or the available aerial RF signals. In this way, the device can determine an optimal aerial RF signal for the aerial vehicle to use to communicate, such that the aerial vehicle can have a threshold value of a measurement related to RF signals and/or wireless communications (e.g., SINR, a received signal strength indicator (RSSI), etc.), a reduced quantity of error-containing communications, a reduced quantity of lost connections, and/or the like. This improves communications of the aerial vehicle, improves connectivity of the aerial vehicle, and/or the like. In addition, this conserves processing resources of the aerial vehicle and/or the device that would otherwise be consumed due to poor aerial RF signal quality, attempting to reestablish connectivity that was lost due to poor aerial RF signal quality, and/or the like. In addition, the device can manage use of aerial RF signals by multiple aerial vehicles, thereby improving a measurement related to RF signals and/or wireless communications, communications, connectivity, and/or the like for multiple aerial vehicles.

Figure 1:
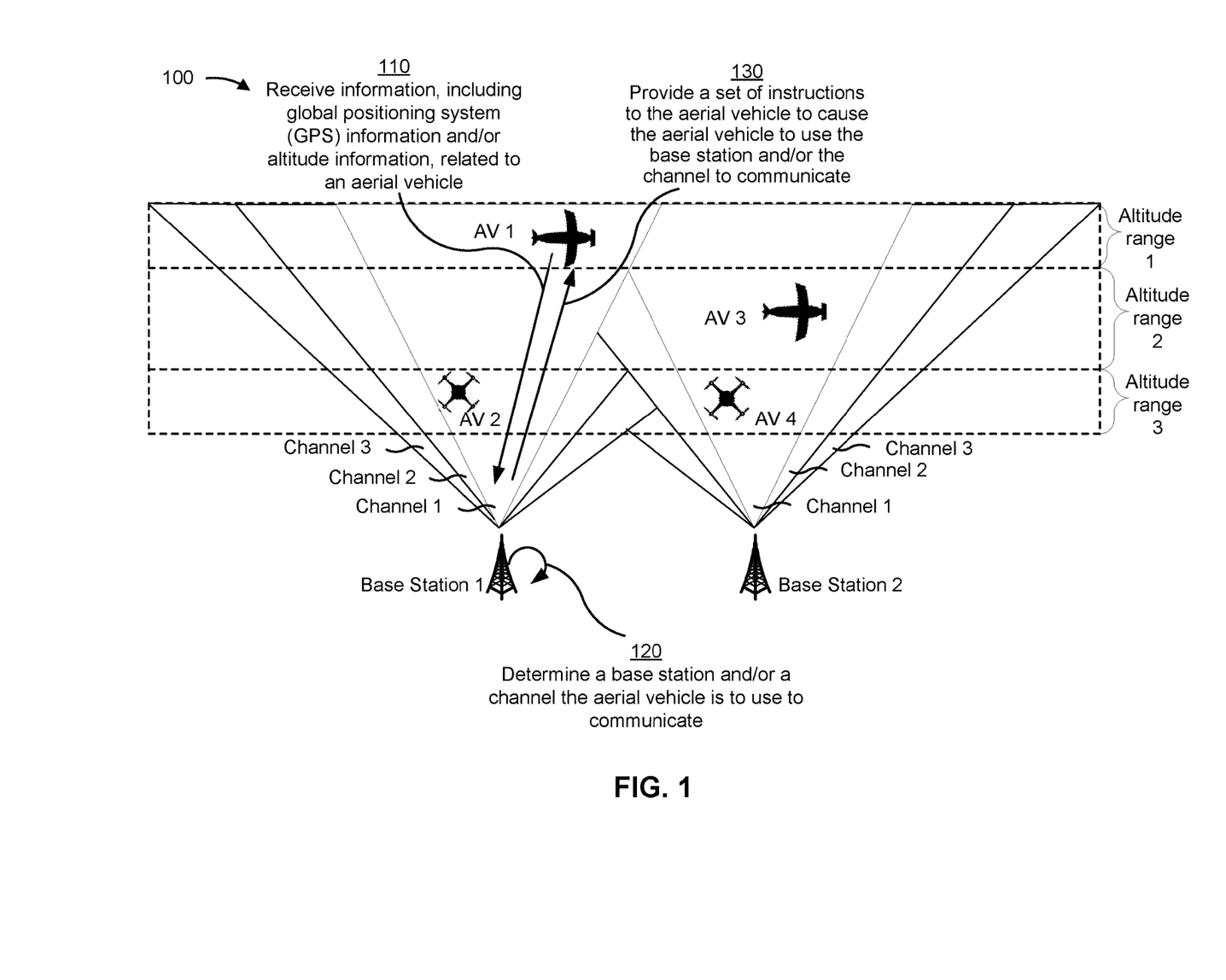
FIG. 1 is a diagram of an overview of an example implementation described herein.

FIG. 1 is a diagram of an overview of an example implementation 100 described herein. As shown in FIG. 1, example implementation 100 can include a set of aerial vehicles (AVs) (e.g., shown as a AVs 1 through 4) and a set of base stations (e.g., shown as base station 1 and base station 2). Although FIG. 1 shows four aerial vehicles and two base stations, in practice, there can be hundreds, thousands, etc. of aerial vehicles and base stations. AVs 1 through 4 can travel at various altitude ranges (e.g., shown as altitude ranges 1 through 3). Base stations 1 and 2 can output aerial RF signals at various frequencies. In addition, base stations 1 and 2 can output the aerial RF signals at various beam widths (e.g., base stations 1 and 2 can output an aerial RF signal at a first frequency using a narrower beam width than an aerial RF signal at a second frequency, which can have a narrower beam width than an aerial RF signal at third frequency). The combination of frequency and beam width for an RF signal can be referred to herein as a channel (e.g., shown as channels 1 through 3 in FIG. 1). In other words, different channels can have different beam widths, different frequencies, and/or the like.

As further shown in FIG. 1, and as shown by reference number 110, base station 1 can receive information, including global positioning system (GPS) information and/or altitude information, related to an aerial vehicle. For example, base station 1 can receive, from AV 1, information related to AV 1.

In some implementations, the information can identify a GPS location (e.g., latitude and/or longitude) of AV 1 and/or an altitude at which AV 1 is traveling. Additionally, or alternatively, base station 1 can receive or determine other information, such as information identifying a direction of travel of AV 1, or whether AV 1 is a particular type or class of aerial vehicle (e.g., a commercial aerial vehicle, a recreational aerial vehicle, a public safety aerial vehicle associated with law enforcement or a rescue service, etc.). Additionally, or alternatively, base station 1 can receive or determine other information, such as a quantity of aerial vehicles within a threshold proximity of base stations 1 and/or 2, a distance of AV 1 from base stations 1 and/or 2, and/or the like. In addition, although not shown, base station 1 and/or base station 2 can each receive information from a combination of AVs 1 through 4. Further, although not shown, base stations 1 and 2 can exchange information received from AVs 1 through 4, such that base stations 1 and 2 have information related to AVs 1 through 4.

As further shown in FIG. 1, and as shown by reference number 120, base station 1 can determine a base station and/or a channel the aerial vehicle is to use to communicate. For example, base station 1 can determine a base station and/or channel that AV 1 is to use to communicate. In some implementations, a base station can determine the base station and/or channel based on an altitude of the aerial vehicle. For example, for AV 1, base station 1 can determine that AV 1 is to connect to base station 1 and is to communicate using channel 1 based on AV 1 being within altitude range 1 and being within an area covered by the aerial RF signal at channel 1.

In some implementations, a base station can determine the base station and/or channel based on a direction of travel of the aerial vehicle. For example, for AV 1, base station 1 can determine that AV 1 is to connect to base station 2 and is to use channel 1 based on AV 1 traveling toward base station 2 and toward an area covered by the aerial RF signal at channel 1. In some implementations, a base station can determine the base station and/or channel based on a combination of the above described factors, or based on other information, as described below. For example, for AV 1, base station 1 can determine a base station and/or a channel based on a combination of an altitude range of AV 1, a direction of travel of AV 1, a distance of AV 1 from base station 1 and/or 2, and/or the like. In addition, base station 1 and/or 2 can determine a base station and/or a channel for any one of AVs 1 through 4 in a similar manner.

In some implementations, multiple base stations can communicate to manage use of an aerial RF frequency. For example, base station 1 and base station 2 can communicate to determine which base stations and/or channels AVs 1 through 4 are to use, such as to load balance a quantity of aerial vehicles using any one base station and/or channel, to ensure that each of AVs 1 through 4 has a threshold value for a measurement (e.g., SINR) to ensure a particular quality of service for particular types of aerial vehicles (e.g., commercial aerial vehicles, public safety aerial vehicles, etc.), and/or the like. In this way, base stations 1 and 2 can manage aerial RF signals.

As further shown in FIG. 1, and as shown by reference number 130, base station 1 can provide a set of instructions to the aerial vehicle to cause the aerial vehicle to use the base station and/or the channel to communicate. For example, base station 1 can provide a set of instructions to AV 1 to cause AV 1 to use base station 1 and channel 1 to communicate.

Additionally, or alternatively, base station 1 can provide a set of instructions to AV 1 to cause AV 1 to use a different altitude range, to change direction, and/or the like (e.g., to increase a SINR, or another measurement, of an aerial RF signal received by AV 1, to cause AV 1 and/or another aerial vehicle to have a threshold SINR or another threshold measurement, etc.). For example, base station 1 can provide a set of instructions to AV 1 to cause AV 1 to use altitude range 2 instead of altitude range 1. Although not shown, base stations 1 and/or 2 can provide a set of instructions to any of AVs 1 through 4 in a similar manner, base stations 1 and 2 can exchange a set of instructions to be provided to any of AVs 1 through 4, and/or the like.

In this way, a base station can determine an optimal aerial RF signal for an aerial vehicle to use to communicate, such that the aerial vehicle can have a threshold value for a measurement (e.g., SINR, RSSI, etc.), a reduced quantity of error-containing communications, a reduced quantity of lost connections, and/or the like. This improves communications of the aerial vehicle, improves connectivity of the aerial vehicle, and/or the like. In addition, this conserves processing resources of the aerial vehicle and/or the device that would otherwise be consumed due to poor aerial RF signal quality, attempting to reestablish connectivity that was lost due to poor aerial RF signal quality, and/or the like. In addition, the device can manage use of aerial RF signals by multiple aerial vehicles, thereby improving a measurement, communications, connectivity, and/or the like for multiple aerial vehicles.

As indicated above, FIG. 1 is provided merely as an example. Other examples are possible and can differ from what was described with regard to FIG. 1. Although FIG. 1 was described with respect to base station 1 and AV 1, the implementations apply equally to base station 2, and AVs 2 through 4. Although some implementations were described with respect to SINR, dropped communications, and/or the like, the implementations described herein apply equally to other types of measurements related to RF signals and/or wireless communications, such as received signal strength indicator (RSSI), network congestion, signal attenuation, and/or the like.

Figure 2:
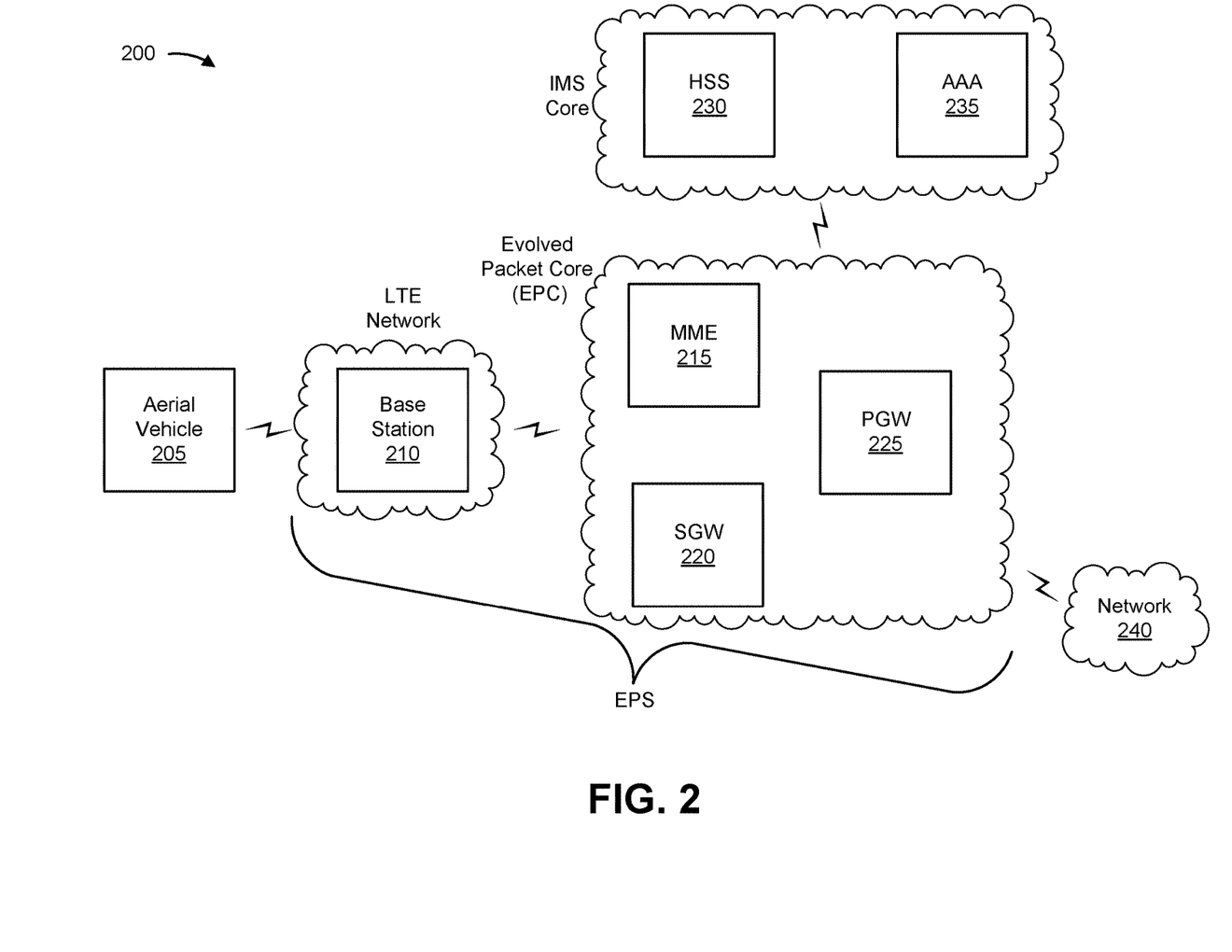
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include an aerial vehicle 205; a base station 210; a mobility management entity device (MME) 215; a serving gateway (SGW) 220; a packet data network gateway (PGW) 225; a home subscriber server (HSS) 230; an authentication, authorization, and accounting server (AAA) 235; and a network 240. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a third generation (3G) network, a fourth generation (4G) network, a fifth generation (5G) network, etc.

Environment 200 includes an evolved packet system (EPS) that includes an LTE network and/or an evolved packet core (EPC) that operate based on a third generation partnership project (3GPP) wireless communication standard. The LTE network can include a radio access network (RAN) that includes one or more base stations 210 that take the form of evolved Node Bs (eNBs) via which aerial vehicle 205 communicates with the EPC. The EPC includes MME 215, SGW 220, and/or PGW 225 that enable aerial vehicle 205 to communicate with network 240 and/or an Internet protocol (IP) multimedia subsystem (IMS) core. The IMS core can include HSS 230 and/or AAA 235, and can manage device registration and authentication, session initiation, etc., associated with aerial vehicle 205. HSS 230 and/or AAA 235 can reside in the EPC and/or the IMS core.

Aerial vehicle 205 includes one or more vehicles capable of communicating with base station 210 and/or a network (e.g., network 240). For example, aerial vehicle 205 can include an unmanned aerial vehicle (UAV), an autonomous aerial vehicle, an airplane, a helicopter, an airship, and/or a similar type of vehicle. In some implementations, aerial vehicle 205 can record information relating to aerial vehicle 205 using a sensor and/or device associated with aerial vehicle 205 (e.g., a barometer, an altimeter, a GPS navigation system, a user device associated with a passenger of aerial vehicle 205, etc.), as described in more detail elsewhere herein. Additionally, or alternatively, aerial vehicle 205 can provide the recorded information to base station 210, as described elsewhere herein. In some implementations, a user device associated with aerial vehicle 205 and/or a passenger of aerial vehicle 205 can include a mobile phone (e.g., a smartphone or a radiotelephone), a laptop computer, a tablet computer, a gaming device, a wearable communication device (e.g., a smart wristwatch or a pair of smart eyeglasses), a GPS navigation system, or a similar type of device. In some implementations, a reference to aerial vehicle 205 can include a reference to a user device associated with aerial vehicle 205. Although FIG. 2 shows a single aerial vehicle 205, in practice, there can be hundreds, thousands, millions, etc. of aerial vehicles 205 communicating with hundreds, thousands, millions, etc. of base stations 210, as described elsewhere herein.

Base station 210 includes one or more devices capable of transferring traffic, such as audio, video, text, and/or other traffic, destined for and/or received from aerial vehicle 205. In some implementations, base station 210 can include an eNB associated with the LTE network that receives traffic from and/or sends traffic to network 240 via SGW 220 and/or PGW 225. Additionally, or alternatively, one or more base stations 210 can be associated with a RAN that is not associated with the LTE network. Base station 210 can send traffic to and/or receive traffic from aerial vehicle 205 via an air interface. In some implementations, base station 210 can include a small cell base station, such as a base station of a microcell, a picocell, and/or a femtocell. Although FIG. 2 shows a single base station 210, in practice, there can be hundreds, thousands, millions, etc. of base stations 210 managing use of aerial RF signals by hundreds, thousands, millions, etc. of aerial vehicles 205 (e.g., exchanging information among base stations 210, among aerial vehicles 205, etc.), as described elsewhere herein.

MME 215 includes one or more devices, such as one or more server devices, capable of managing authentication, activation, deactivation, and/or mobility functions associated with aerial vehicle 205. In some implementations, MME 215 can perform operations relating to authentication of aerial vehicle 205. Additionally, or alternatively, MME 215 can facilitate the selection of a particular SGW 220 and/or a particular PGW 225 to serve traffic to and/or from aerial vehicle 205. MME 215 can perform operations associated with handing off aerial vehicle 205 from a first base station 210 to a second base station 210 when aerial vehicle 205 is transitioning from a first cell associated with the first base station 210 to a second cell associated with the second base station 210. Additionally, or alternatively, MME 215 can select another MME (not pictured), to which aerial vehicle 205 should be handed off (e.g., when aerial vehicle 205 moves out of range of MME 215).

SGW 220 includes one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 240 (e.g., via PGW 225) and/or other network devices associated with the EPC and/or the IMS core. SGW 220 can also receive traffic from network 240 and/or other network devices, and can send the received traffic to aerial vehicle 205 via base station 210. Additionally, or alternatively, SGW 220 can perform operations associated with handing off aerial vehicle 205 to and/or from an LTE network.

PGW 225 can include one or more devices capable of providing connectivity for aerial vehicle 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 240. Additionally, or alternatively, PGW 225 can receive traffic from network 240, and can send the traffic to aerial vehicle 205 via SGW 220 and base station 210. PGW 225 can record data usage information (e.g., byte usage), and can provide the data usage information to AAA 235.

HSS 230 includes one or more devices, such as one or more server devices, capable of managing (e.g., receiving, generating, storing, processing, and/or providing) information associated with aerial vehicle 205. For example, HSS 230 can manage subscription information associated with aerial vehicle 205, such as information that identifies a subscriber profile of a user associated with aerial vehicle 205, information that identifies services and/or applications that are accessible to aerial vehicle 205, location information associated with aerial vehicle 205, a network identifier (e.g., a network address) that identifies aerial vehicle 205, information that identifies a treatment of aerial vehicle 205 (e.g., quality of service information, a quantity of minutes allowed per time period, a quantity of data consumption allowed per time period, etc.), and/or similar information. HSS 230 can provide this information to one or more other devices of environment 200 to support the operations performed by those devices.

AAA 235 includes one or more devices, such as one or more server devices, that perform authentication, authorization, and/or accounting operations for communication sessions associated with aerial vehicle 205. For example, AAA 235 can perform authentication operations for aerial vehicle 205 and/or a user of aerial vehicle 205 (e.g., using one or more credentials), can control access, by aerial vehicle 205, to a service and/or an application (e.g., based on one or more restrictions, such as time-of-day restrictions, location restrictions, single or multiple access restrictions, read/write restrictions, etc.), can track resources consumed by aerial vehicle 205 (e.g., a quantity of voice minutes consumed, a quantity of data consumed, etc.), and/or can perform similar operations.

Network 240 includes one or more wired and/or wireless networks. For example, network 240 can include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
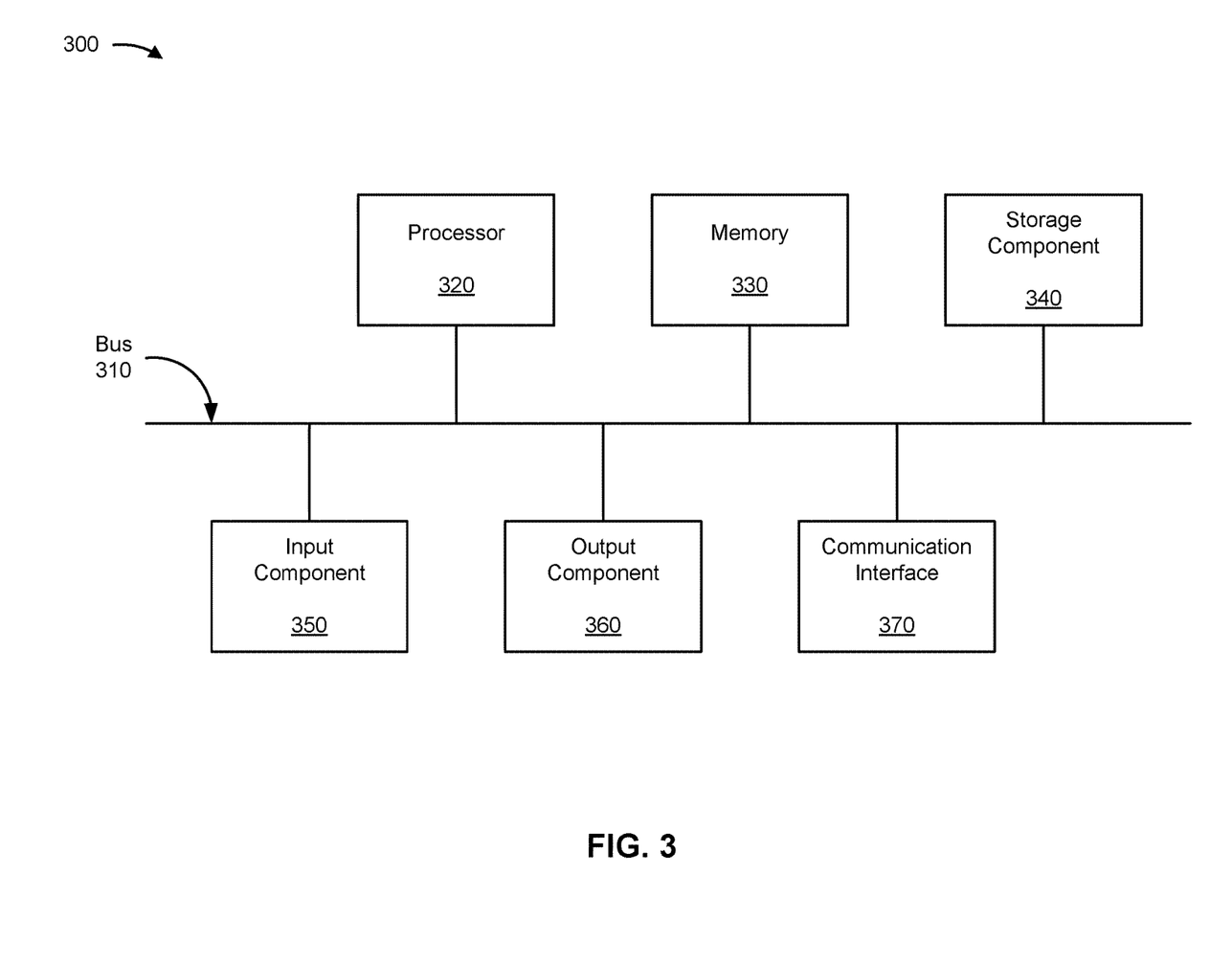
FIG. 3 is a diagram of example components of one or more devices of FIG. 2.

FIG. 3 is a diagram of example components of a device 300. Device 300 can correspond to aerial vehicle 205, base station 210, MME 215, SGW 220, PGW 225, HSS 230, and/or AAA 235. In some implementations, aerial vehicle 205, base station 210, MME 215, SGW 220, PGW 225, HSS 230, and/or AAA 235 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operations and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
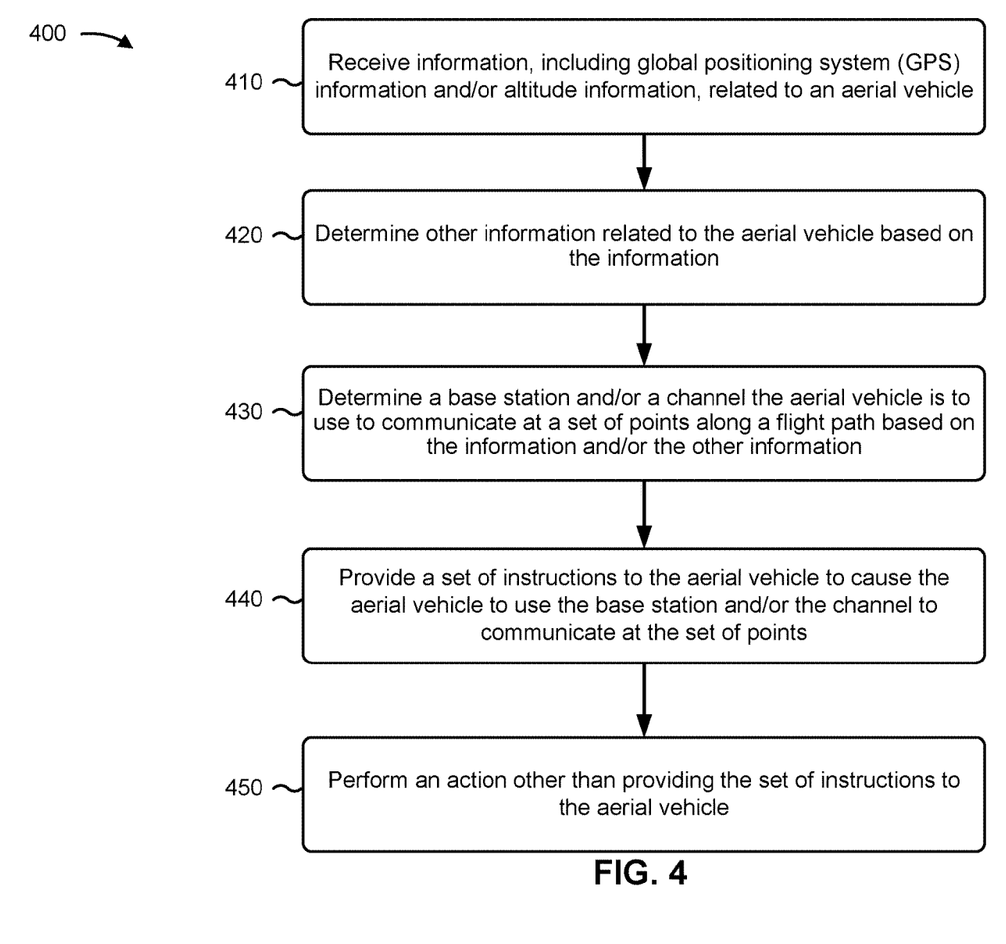
FIG. 4 is a flow chart of an example process for aerial radio frequency (RF) management.

FIG. 4 is a flow chart of an example process 400 for aerial RF management. In some implementations, one or more process blocks of FIG. 4 can be performed by base station 210. In some implementations, one or more process blocks of FIG. 4 can be performed by another device or a group of devices separate from or including base station 210, such as aerial vehicle 205, MME 215, SGW 220, PGW 225, HSS 230, and AAA 235.

As shown in FIG. 4, process 400 can include receiving information, including global positioning system (GPS) information and/or altitude information, related to an aerial vehicle (block 410) and determining other information related to the aerial vehicle based on the information (block 420). For example, base station 210 can receive information, including GPS information and/or altitude information, related to aerial vehicle 205 and can determine other information related to aerial vehicle 205 based on the information. In some implementations, base station 210 can receive the information from aerial vehicle 205. Additionally, or alternatively, base station 210 can receive the information from another base station 210 (e.g., that received the information from aerial vehicle 205).

In some implementations, base station 210 can receive the information periodically, according to a schedule, based on requesting the information, based on input from a user associated with aerial vehicle 205, and/or the like. Additionally, or alternatively, base station 210 can receive the information from a user device associated with aerial vehicle 205 (e.g., a GPS navigation system of aerial vehicle 205, a user device associated with a passenger of aerial vehicle 205, etc.), a sensor associated with aerial vehicle 205 (e.g., an altimeter, a barometer, etc.), and/or the like. In some implementations, base station 210 can receive the information from multiple aerial vehicles 205, from multiple other base stations 210 communicating with aerial vehicle 205, and/or the like.

In some implementations, information from aerial vehicle 205 can include GPS information (e.g., that identifies a physical location of aerial vehicle 205, such as latitude and longitude), altitude information (e.g., an altitude of aerial vehicle 205), a value of a measurement related to an RF signal and/or wireless communications (e.g., SINR, RSSI, etc.), of an aerial RF signal received by aerial vehicle 205, a direction of travel of aerial vehicle 205, a distance of aerial vehicle 205 from base station 210 and/or from another base station 210, a manner in which aerial vehicle 205 is being used (e.g., commercial, recreational, research, transportation, shipping, public safety, etc.), a configuration of aerial vehicle 205 (e.g., a version of software, a type and/or version of hardware, etc.), and/or the like.

In some implementations, base station 210 can determine the information and/or other information rather than, or in association with, receiving the information from aerial vehicle 205 (e.g., base station 210 can determine other information). For example, base station 210 can receive an identifier that identifies aerial vehicle 205 and can perform a look up of the identifier in a data structure to determine the information (e.g., to determine a configuration of aerial vehicle 205, a manner in which aerial vehicle 205 is being used, an account associated with aerial vehicle 205, a level of service associated with aerial vehicle 205, etc.). As another example, base station 210 can receive a set of latitude and longitude coordinates and can determine a direction of travel of aerial vehicle 205, a geographic location of aerial vehicle 205, whether aerial vehicle 205 is over an urban area or a rural area, and/or the like. Additionally, or alternatively, base station 210 can determine other information, such as a quantity of aerial vehicles 205 within a geographic area (e.g., within a threshold distance of base station 210 and/or another base station 210).

In some implementations, base station 210 can receive thousands, millions, billions, etc. of data elements from aerial vehicle 205. Additionally, or alternatively, base station 210 can receive information from hundreds, thousands, millions, etc. of aerial vehicles 205. In this way, base station 210 can receive a data set that cannot be processed manually or objectively by a human actor.

In this way, base station 210 can receive information from aerial vehicle 205 and/or determine other information related to aerial vehicle 205, thereby permitting base station 210 to determine a particular base station 210 and/or channel that aerial vehicle 205 is to use to communicate.

As further shown in FIG. 4, process 400 can include determining a base station and/or a channel the aerial vehicle is to use to communicate at a set of points along a flight path based on the information and/or the other information (block 430). For example, base station 210 can determine a particular base station 210 and/or a channel that aerial vehicle 205 is to use to communicate at a set of points along a flight path based on the information. In some implementations, base station 210 can determine the particular base station 210 and/or channel after receiving the information, after receiving a threshold amount of information, in real-time (e.g., as base station 210 receives the information), after receiving an indication that a value of a measurement of an aerial RF signal received by aerial vehicle 205 satisfies a threshold, and/or the like.

In some implementations, a frequency can include a frequency of an RF signal (e.g., kilohertz (kHz), megahertz (MHz), gigahertz (GHz), etc.). In some implementations, a frequency can be associated with a licensed frequency spectrum (e.g., a 1900 MHz frequency spectrum, a 1700 MHz frequency spectrum, etc.). Additionally, or alternatively, a frequency can be associated with an unlicensed frequency spectrum (e.g., a 5 GHz frequency spectrum). In some implementations, base station 210 can transmit RF signals at multiple frequencies (e.g., as described above with respect to FIG. 1). Additionally, or alternatively, base station 210 can transmit RF signals at different beam widths. For example, an RF signal can have a first beam width, a second RF signal can have a second beam width that is narrower than the first beam width, and so forth (e.g., as described above with respect to FIG. 1). In some implementations, a combination of frequency and beam width can be referred to herein as a channel. In other words, a channel can be associated with a frequency, can have a beam width, and/or the like.

In some implementations, base station 210 can determine a particular base station 210 and/or channel that aerial vehicle 205 is to use based on information received from aerial vehicle 205. In some implementations, base station 210 can determine the particular base station 210 and/or channel based on an altitude of aerial vehicle 205. For example, base station 210 can determine the particular base station 210 and/or channel based on aerial vehicle 205 having a threshold altitude, being within an altitude range, based on an altitude of other aerial vehicles 205, and/or the like. For example, base station 210 can determine that a first aerial vehicle 205 is to use a first channel based on being within a first altitude range, based on a second aerial vehicle 205 being within the first altitude range or a second altitude range, and/or the like.

Additionally, or alternatively, base station 210 can determine the particular base station 210 and/or channel based on a direction of travel of aerial vehicle 205. For example, base station 210 can determine the particular base station 210 and/or channel based on determining that aerial vehicle 205 is traveling towards a particular base station 210 and/or away from another particular base station 210. In this way, base station 210 can determine a particular base station 210 and/or channel for aerial vehicle 205 to use to communicate such that a measurement related to an aerial RF signal and/or wireless communications satisfies a threshold as aerial vehicle 205 travels in a particular direction.

Additionally, or alternatively, base station 210 can determine the particular base station 210 and/or channel based on a quantity of devices that are connected to base station 210 and/or that use a particular channel (e.g., a quantity of aerial vehicles 205, a quantity of user devices of passengers of aerial vehicle 205, etc.). In this case, base station 210 can determine that aerial vehicle 205 is to use base station 210 and/or a channel based on a threshold quantity of aerial vehicles 205 being connected to base station 210 and/or using the channel. In this way, base station 210 can load balance multiple devices across multiple base stations 210 and/or channels, thereby conserving processing resources of aerial vehicle 205 and/or base station 210 that would otherwise be consumed from dropped communications, error-containing communications, and/or the like due to overloading of base station 210 and/or a channel.

Additionally, or alternatively, base station 210 can determine the particular base station 210 and/or channel based on a distance between aerial vehicle 205 and base station 210 and/or another base station 210. For example, base station 210 can determine that aerial vehicle 205 is to use a particular base station 210 and/or a channel based on a distance between aerial vehicle 205 and base station 210 satisfying a threshold. In some implementations, base station 210 can determine the particular base station 210 and/or channel based on a distance between aerial vehicle 205 and another base station 210 (e.g., using information received from the other base station 210, based on determining the distance between aerial vehicle 205 and the other base station 210, etc.).

Additionally, or alternatively, base station 210 can determine the particular base station 210 and/or channel based on a manner in which aerial vehicle 205 is being used. For example, base station 210 can prioritize commercial aerial vehicles 205 and/or public safety aerial vehicles 205 higher than recreational aerial vehicles 205, such that commercial aerial vehicles 205 and/or public safety aerial vehicles 205 have a higher average SINR relative to recreational aerial vehicles 205, are ensured a threshold SINR, have a higher priority relative to recreational aerial vehicles 205 with regard to assigning a particular base station 210 and/or channel, and/or the like. In some implementations, base station 210 can determine a manner in which aerial vehicle 205 is being used. For example, base station 210 can determine a manner in which aerial vehicle 205 is being used by performing a lookup of information identifying aerial vehicle 205 in a data structure that includes information identifying various aerial vehicles 205 and corresponding uses. Additionally, or alternatively, and as another example, base station 210 can determine a manner in which aerial vehicle 205 is being used based on actions of aerial vehicle 205.

Continuing with the previous example, base station 210 can determine that aerial vehicle 205 is a commercial aerial vehicle 205 based on aerial vehicle 205 maintaining a particular altitude for a threshold distance (e.g., a cruising altitude), based on aerial vehicle 205 traveling from/to a particular type of location, such as a commercial airport, a shipping facility, a hospital, and/or the like (e.g., as determined using information related to aerial vehicle 205), based on other channels that aerial vehicle 205 is using for other types of communications (e.g., communications with an air traffic control tower), based on a speed at which aerial vehicle 205 is travelling (e.g., a speed that satisfies a threshold can indicate that aerial vehicle 205 is an aircraft, a commercial aerial vehicle 205, etc.), and/or the like. Conversely, and as another example, base station 210 can determine that aerial vehicle 205 is a recreational aerial vehicle 205 based on aerial vehicle 205 changing altitude a threshold quantity of times in a threshold amount of time, a type of hardware and/or software associated with aerial vehicle 205, whether aerial vehicle 205 has a threshold altitude in a particular area (e.g., an altitude of 50 meters, 10 meters, 100 meters, etc. in an urban area can indicate that aerial vehicle 205 is a recreational aerial vehicle 205), based on a speed of aerial vehicle 205 (e.g., a speed that fails to satisfy a threshold can indicate that aerial vehicle 205 is a UAV, a recreational aerial vehicle 205, etc.), and/or the like.

In some implementations, base station 210 can determine a particular base station 210 and/or channel based on a quality of service level of an account associated with aerial vehicle 205. For example, an account associated with aerial vehicle 205 can be associated with a quality of service level where aerial vehicle 205 is ensured a threshold SINR, or another threshold measurement, a threshold guarantee for communications (e.g., a 99 percent uptime guarantee), and/or the like.

Additionally, or alternatively, base station 210 can determine the particular base station 210 and/or channel based on historical demand and/or predicted demand for use of an aerial RF signal. For example, base station 210 can determine a particular base station 210 for aerial vehicle 205 to use based on information that identifies a historical demand for a particular time of the day, day of the week, geographic area, and/or the like. Additionally, or alternatively, and as another example, base station 210 can determine a particular base station 210 based on predicting demand for an aerial RF frequency, such as information that identifies a quantity of aerial vehicles 205 that are traveling in the direction of base station 210, a quantity of aerial vehicles 205 that are scheduled to travel within a threshold distance of base station 210 (e.g., based on a quantity of flight plans filed for a particular flight path), based on a quantity of aerial vehicles 205 that are using a terrestrial RF signal but are at a threshold altitude or are within a threshold altitude of using an aerial RF signal, and/or the like.

Additionally, or alternatively, base station 210 can determine the particular base station 210 and/or channel based on a location of aerial vehicle 205 (e.g., an urban location or a rural location, an industrial area or a residential area, etc. as determined using GPS information). For example, base station 210 can prioritize aerial vehicles 205 in an urban area or a residential area higher than aerial vehicles in a rural area or an industrial area. In this way, base station 210 can ensure higher SINR or improved communications in areas where a loss of command and/or control of aerial vehicle 205 can cause more damage (e.g., to structures in an urban or residential area), can be more likely to cause harm to humans (e.g., due to aerial vehicle 205 crashing in an urban area or a residential area), can be needed to permit more accurate navigation (e.g., through an urban landscape), can be needed to satisfy regulatory requirements, and/or the like.

Additionally, or alternatively, base station 210 can determine the particular base station 210 and/or channel based on a combination of factors. For example, although aerial vehicle 205 can be physically closer to a first base station 210 than a second base station 210, base station 210 can determine that aerial vehicle 205 is to communicate via the second base station 210 based on a quantity of aerial vehicles 205 communicating via the first base station 210 satisfying a threshold, based on a direction of travel of aerial vehicle 205, based on a manner in which aerial vehicle 205 is being used, and/or the like.

Additionally, or alternatively, base station 210 can preemptively determine the particular base station 210 and/or channel that aerial vehicle 205 is to use. For example, base station 210 can determine a set of instructions that instruct aerial vehicle 205 to use a set of base stations 210 and/or channels based on a direction of travel of aerial vehicle 205, a flight plan of aerial vehicle 205, a planned cruising altitude of aerial vehicle 205, and/or the like. Continuing with the previous example, base station 210 can receive information related to a flight path of aerial vehicle 205 (e.g., prior to aerial vehicle 205 traveling along the flight path). In this case, base station 210 can determine a set of base stations 210 (e.g., multiple base stations 210) or a set of channels (e.g., multiple channels) aerial vehicle 205 is to use when traveling along the flight path.

In some implementations, base station 210 can determine whether aerial vehicle 205 is to use a licensed frequency spectrum or an unlicensed frequency spectrum. For example, base station 210 can determine whether aerial vehicle 205 is to use a licensed frequency spectrum or an unlicensed frequency spectrum based on a manner of use of aerial vehicle 205, a service level associated with an account associated with aerial vehicle 205, an altitude of aerial vehicle 205, and/or the like. As an example, base station 210 can determine that a commercial aerial vehicle 205 and/or a public safety aerial vehicle 205 is to use a licensed frequency spectrum, and/or can determine that a recreational aerial vehicle 205 is to use an unlicensed frequency spectrum, thereby increasing a likelihood that the commercial aerial vehicle 205 has a threshold SINR, maintains a connection with base station 210, and/or the like via use of a licensed frequency spectrum.

Additionally, or alternatively, and as another example, base station 210 can determine that aerial vehicle 205 can use a licensed frequency spectrum in an urban area (e.g., to ensure that base station 210 maintains command and/or control communications in a populated area). Additionally, or alternatively, and as another example, base station 210 can determine that aerial vehicle 205 can use an unlicensed frequency spectrum in a rural area (e.g., where maintaining communications is not as important as in an urban area, where aerial vehicle 205 can travel on a particular bearing for a threshold distance, etc.).

In some implementations, base station 210 can determine whether aerial vehicle 205 is to use an aerial RF signal or a terrestrial RF signal. For example, when aerial vehicle 205 is within a threshold distance of the ground, a terrestrial RF signal can provide aerial vehicle 205 with a higher SINR and/or improved communications relative to an aerial RF signal. In this case, base station 210 can determine that aerial vehicle 205 is to use a terrestrial RF signal.

In this way, base station 210 can determine a particular base station 210 and/or a channel that aerial vehicle 205 is to use to communicate based on the information, prior to base station 210 providing a set of instructions related to using the particular base station 210 and/or channel to aerial vehicle 205.

As further shown in FIG. 4, process 400 can include providing a set of instructions to the aerial vehicle to cause the aerial vehicle to use the base station and/or the channel to communicate at the set of points (block 440) and performing an action other than providing the set of instructions to the aerial vehicle (block 450). For example, base station 210 can provide a set of instructions to aerial vehicle 205 to cause aerial vehicle 205 to use base station 210 and/or the channel to communicate at the set of points and can perform an action other than providing the set of instructions to aerial vehicle 205. In some implementations, the set of instructions can instruct aerial vehicle 205 to use a particular base station 210 and/or channel (e.g., for a particular amount of time), to use different base stations 210 and/or different channels (e.g., at different points along a flight path of aerial vehicle 205), and/or the like.

In some implementations, base station 210 can perform an action other than providing a set of instructions regarding use of base station 210 and/or a channel. In some implementations, for example, base station 210 can provide a set of instructions to modify a manner in which aerial vehicle 205 is traveling (e.g., altitude, direction, speed, etc.), so that aerial vehicle 205 has a threshold SINR, an average SINR, a threshold quantity of dropped connections, and/or the like when traveling.

Additionally, or alternatively, and as another example, base station 210 can record information related to aerial vehicle 205, selection of base station 210, and/or selection of a channel (e.g., to permit base station 210 to quickly and efficiently determine a base station 210 and/or channel when similar information is received from another aerial vehicle 205). Additionally, or alternatively, base station 210 can provide the information to another base station 210 to permit the other base station 210 to determine a particular base station 210 and/or channel in a similar manner.

Additionally, or alternatively, and as another example, base station 210 can monitor information related to aerial vehicle 205. For example, this can permit base station 210 to modify a particular base station 210 and/or channel that aerial vehicle 205 is using to communicate. In some implementations, base station 210 can monitor the information related to aerial vehicle 205 in real-time, as aerial vehicle 205 is traveling, and/or the like. This permits base station 210 to quickly adjust a particular base station 210 and/or channel that aerial vehicle 205 is using to communicate based on a change to information related to aerial vehicle 205, thereby conserving processing resources that would otherwise be consumed due to dropped communications, error-containing communications, and/or the like.

For example, base station 210 can determine whether a SINR, or a value of another measurement, related to an aerial RF signal received by aerial vehicle 205 satisfies a threshold after providing the set of instructions to aerial vehicle 205 to use a particular base station 210 and/or channel to communicate. In some implementations, base station 210 can determine another base station 210 and/or another channel aerial vehicle 205 is to use when base station 210 determines that the SINR, or the value of the other measurement, fails to satisfy the threshold.

Additionally, or alternatively, and as another example, base station 210 can generate a report that includes information related to aerial vehicle 205, base stations 210 and/or channels that aerial vehicle 205 is using, dropped communications between aerial vehicle 205 and base station 210, and/or the like. In this case, base station 210 can provide the report to a user device (e.g., a computer, a mobile phone, a wearable device, etc.) associated with a network engineer, such as to permit the network engineer to identify high traffic areas that need additional base stations 210 and/or channels.

Additionally, or alternatively, and as another example, base station 210 can activate or deactivate antennas (e.g., with additional channels, frequencies, and/or beam widths) associated with base station 210. For example, base station 210 can activate or deactivate antennas based on a threshold quantity of aerial vehicles 205 being connected to base station 210 and/or using a particular channel. Continuing with the previous example, base station 210 can provide a set of instructions to base station 210 to activate or deactivate antennas. This can permit base station 210 to dynamically improve communications of aerial vehicle 205 via activation and deactivation of antennas based on a need for additional channels. In addition, this conserves processing resources of base station 210 by reducing a quantity antennas to which base station 210 is providing power.

In this way, base station 210 can provide a set of instructions to aerial vehicle 205 to cause aerial vehicle 205 to use base station 210 and/or the channel to communicate.

Although some implementations were described with respect to SINR, dropped communications, and/or the like, the implementations described herein apply equally to other types of measurements related to an RF signal and/or wireless communications, such as received signal strength indicator (RSSI), network congestion, signal attenuation, and/or the like.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5:
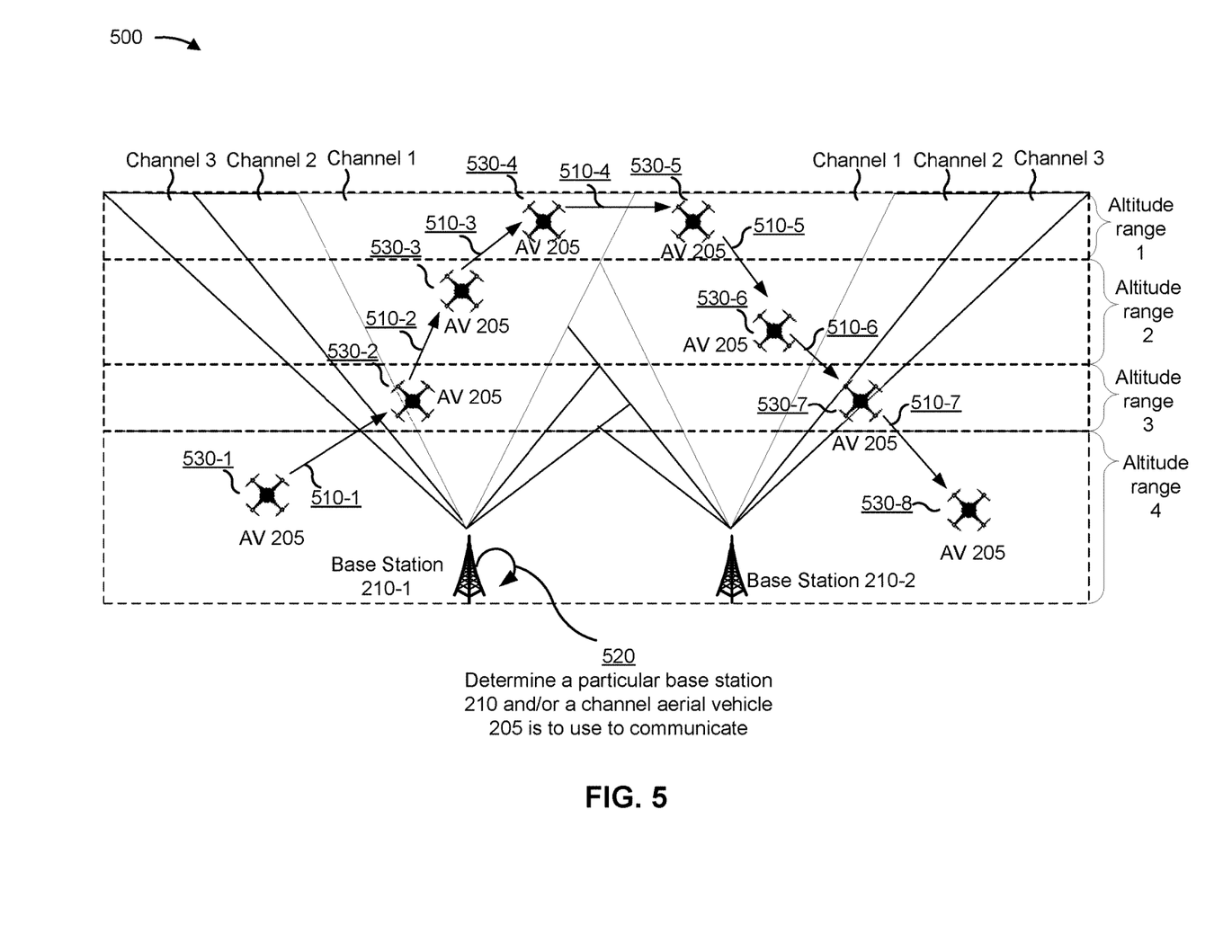
FIG. 5 is a diagram of an example implementation described herein.

FIG. 5 is a diagram of an example implementation 500 relating to example process 400 shown in FIG. 4. FIG. 5 shows an example of base station 210 determining various channels for aerial vehicle 205 (shown as "AV 205") to use to communicate as aerial vehicle 205 moves through various altitude ranges (shown as altitude ranges 1 through 4) along a flight path.

As shown in FIG. 5, and by reference numbers 510-1 through 510-7, aerial vehicle 205 can move through various altitude ranges along a flight path. As shown by reference number 520, base station 210-1 and/or base station 210-2 can determine a particular base station 210 and/or a channel aerial vehicle 205 is to use to communicate. For example, when aerial vehicle 205 is at the point shown by reference number 530-1, base station 210-1 and/or base station 210-2 can determine that aerial vehicle 205 is to use a channel associated with a terrestrial RF signal that base station 210-1 is transmitting (e.g., based on aerial vehicle 205 being within altitude range 4 and within a threshold distance of base station 210-1).

Additionally, or alternatively, and as another example, when aerial vehicle 205 is at the point shown by reference number 530-2, base station 210-1 and/or base station 210-2 can determine that aerial vehicle 205 is to use channel 3 associated with base station 210-1 (e.g., based on aerial vehicle 205 being within altitude range 3 and within a threshold distance of base station 210-1). In some implementations, base station 210-1 and/or base station 210-2 can determine that aerial vehicle 205 is to use channel 3, a channel with a wider beam width relative to channels 1 and 2, based on aerial vehicle 205 being within a threshold altitude of base station 210-1, and is thereby less affected by other signals (e.g., relative to higher altitude ranges).

Additionally, or alternatively, and as another example, when aerial vehicle 205 is at the point shown by reference number 530-3, base station 210-1 and/or base station 210-2 can determine that aerial vehicle 205 is to use channel 2 associated with base station 210-1 (e.g., based on aerial vehicle 205 being within altitude range 2 and within a threshold distance of base station 210-1). In some implementations, base station 210-1 and/or base station 210-2 can determine that aerial vehicle 205 is to use channel 2, a channel with a wider beam width relative to channel 1 and a narrower beam width relative to channel 3, based on aerial vehicle 205 being within a threshold altitude of base station 210-1, and is thereby less affected by other signals relative to altitude range 1 and more affected by other signals relative to altitude range 3. In this way, use of a channel with a narrower beam width relative to other channels improves a signal quality of a signal received by aerial vehicle 205.

Additionally, or alternatively, and as another example, when aerial vehicle 205 is at the point shown by reference number 530-4, base station 210-1 and/or base station 210-2 can determine that aerial vehicle 205 is to use channel 1 associated with base station 210-1 (e.g., based on aerial vehicle 205 being within altitude range 1 and within a threshold distance of base station 210-1). In this way, using a channel with the narrowest beam width relative to other channels when traveling at the highest altitude range relative to other altitude ranges improves a signal quality of a signal that aerial vehicle 205 receives (e.g., by reducing or eliminating effects from other signals that aerial vehicle 205 receives).

Additionally, or alternatively, and as another example, when aerial vehicle 205 is at the point shown by reference number 530-5, base station 210-1 and/or base station 210-2 can determine that aerial vehicle 205 is to use channel 1 associated with base station 210-2 (e.g., based on aerial vehicle 205 being within altitude range 1 and within a threshold distance of base station 210-2). Additionally, or alternatively, and as another example, when aerial vehicle 205 is at the point shown by reference number 530-6, base station 210-1 and/or base station 210-2 can determine that aerial vehicle 205 is to use channel 2 associated with base station 210-2 (e.g., based on aerial vehicle 205 being within altitude range 2 and within a threshold distance of base station 210-2).

Additionally, or alternatively, and as another example, when aerial vehicle 205 is at the point shown by reference number 530-7, base station 210-1 and/or base station 210-2 can determine that aerial vehicle 205 is to use channel 3 associated with base station 210-2 (e.g., based on aerial vehicle 205 being within altitude range 3 and within a threshold distance of base station 210-2). Additionally, or alternatively, and as another example, when aerial vehicle 205 is at the point shown by reference number 530-8, base station 210-1 and/or base station 210-2 can determine that aerial vehicle 205 is to use a channel associated with a terrestrial RF signal transmitted by base station 210-2 (e.g., based on aerial vehicle 205 being within altitude range 4 and within a threshold distance of base station 210-2).

In this way, base station 210 can determine a channel and/or a particular base station 210 that aerial vehicle 205 is to use as aerial vehicle 205 travels through various altitude ranges along a flight path. This permits base station 210 to determine a channel that optimizes a signal quality of a signal received by aerial vehicle 205, thereby improving communications of aerial vehicle 205.

As indicated above, FIG. 5 is provided merely as an example. Other examples are possible and can differ from what was described with regard to FIG. 5.

Some implementations, described herein, provide a device that is capable of receiving information related to an aerial vehicle and available aerial RF signals and determining an aerial RF signal for the aerial vehicle to use to communicate based on the information related to the aerial vehicle and/or the available aerial RF signals. In this way, the device can determine an optimal aerial RF signal for the aerial vehicle to use to communicate, such that the aerial vehicle can have a threshold value of a measurement related to RF signals and/or wireless communications, a reduced quantity of error-containing communications, a reduced quantity of lost connections, and/or the like. This improves communications of the aerial vehicle, improves connectivity of the aerial vehicle, and/or the like. In addition, this conserves processing resources of the aerial vehicle and/or the device that would otherwise be consumed due to poor aerial RF signal quality, attempting to reestablish connectivity that was lost due to poor aerial RF signal quality, and/or the like. In addition, the device can manage use of aerial RF signals by multiple aerial vehicles, thereby improving a value of a measurement related to RF signals and/or wireless communications, communications, connectivity, and/or the like for multiple aerial vehicles.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
  receive, from an aerial vehicle, information related to the aerial vehicle,
    the information including:
      altitude information, and
      global positioning system (GPS) information, and
      the information to be used by the device to manage use of an aerial radio frequency (RF) signal by multiple aerial vehicles including the aerial vehicle;
  determine other information related to the aerial vehicle based on the information;
  determine, using the GPS information, a base station, of a set of base stations, and a channel, of a set of channels associated with the base station, the aerial vehicle is to use to communicate based on the information,
    each of the set of channels having a different beam width, of a set of beam widths,
      the set of beam widths including a narrow beam width and a wide beam width,
        the narrow beam width to be used by the aerial vehicle at a high altitude, and
        the wide beam width to be used by the aerial vehicle at a low altitude,
    different channels, of the set of channels, to be used by the aerial vehicle at different altitudes,
    the set of channels including a first channel and a second channel, and
    the aerial vehicle using the first channel at a first altitude and the second channel at a second altitude;
  provide a set of instructions to the aerial vehicle to cause the aerial vehicle to use the base station or the channel to communicate based on determining the base station and the channel; and
  perform an action other than providing the set of instructions to the aerial vehicle.

2. The device of claim 1, where the one or more processors, when determining the other information, are to:
determine the other information related to the aerial vehicle or to determining the base station and the channel the aerial vehicle is to use,
  the other information including:
    a direction of travel of the aerial vehicle,
    a distance the aerial vehicle is from the base station,
    a quantity of aerial vehicles within a particular geographic area,
    a manner in which the aerial vehicle is being used, or
    a configuration of the aerial vehicle; and
where the one or more processors, when determining the base station and the channel, are to:
  determine the base station and the channel based on the other information.

3. The device of claim 1, where the one or more processors are further to:
determine that the aerial vehicle is traveling at a threshold altitude or within a particular altitude range using the altitude information; and
where the one or more processors, when determining the base station and the channel, are to:
  determine the base station and the channel based on determining that the aerial vehicle is traveling at the threshold altitude or within the particular altitude range.

4. The device of claim 1, where the one or more processors are further to:
receive additional information from another device,
  the additional information relating to one or more other aerial vehicles, of the multiple aerial vehicles; and
where the one or more processors, when determining the base station and the channel, are to:
  determine the base station and the channel for the one or more other aerial vehicles or the aerial vehicle based on the additional information.

5. The device of claim 1, where the one or more processors are further to:
receive information related to a flight path of the aerial vehicle prior to the aerial vehicle traveling along the flight path; and
where the one or more processors, when determining the base station and the channel, are to:
  determine multiple base stations or multiple channels the aerial vehicle is to use when traveling along the flight path.

6. The device of claim 1, where the one or more processors, when providing the set of instructions, are to:
provide the set of instructions to cause the aerial vehicle to modify at least one of an altitude of the aerial vehicle, a speed of travel of the aerial vehicle, or a direction of travel of the aerial vehicle.

7. The device of claim 1, where the one or more processors are further to:
determine whether the aerial vehicle is to use a licensed frequency spectrum or an unlicensed frequency spectrum using the information; and
where the one or more processors, when providing the set of instructions, are to:
  provide the set of instructions to cause the aerial vehicle to use the licensed frequency spectrum or the unlicensed frequency spectrum.

8. A non-transitory computer-readable medium storing instructions, the instructions comprising:

one or more instructions that, when executed by one or more processors of a device, cause the one or more processors to:
  receive, from an aerial vehicle, information related to the aerial vehicle,
    the information including:
      altitude information, and
      global positioning system (GPS) information, and
    the information to be used by the device to manage use of an aerial radio frequency (RF) signal by multiple aerial vehicles including the aerial vehicle;
  determine other information related to the aerial vehicle based on the information;
  determine, using the GPS information, a base station, of a set of base stations, and a channel, of a set of channels associated with the base station, the aerial vehicle is to use to communicate based on the information,
    each of the set of channels having a different beam width, of a set of beam widths,
      the set of beam widths including a narrow beam width and a wide beam width,
        the narrow beam width to be used by the aerial vehicle at a high altitude, and
        the wide beam width to be used by the aerial vehicle at a low altitude,
    different channels, of the set of channels, to be used by the aerial vehicle at different altitudes,
    the set of channels including a first channel and a second channel, and
    the aerial vehicle using the first channel at a first altitude and the second channel at a second altitude;
  provide a set of instructions to the aerial vehicle to cause the aerial vehicle to use the base station or the channel to communicate based on determining the base station and the channel; and
  perform an action other than providing the set of instructions to the aerial vehicle.

9. The non-transitory computer-readable medium of claim 8, where the one or more instructions, when executed by the one or more processors, further cause the one or more processors to:
  determine whether the aerial vehicle is to use the aerial RF signal or a terrestrial RF signal based on the altitude information; and
  where the one or more instructions, that cause the one or more processors to provide the set of instructions, further cause the one or more processors to:
    provide the set of instructions to cause the aerial vehicle to use the aerial RF signal or the terrestrial RF signal based on determining whether the aerial vehicle is to use the aerial RF signal or the terrestrial RF signal.

10. The non-transitory computer-readable medium of claim 8, where the one or more instructions, that cause the one or more processors to determine the base station and the channel, cause the one or more processors to:
  determine the base station and the channel based on a combination of:
    a quantity of aerial vehicles using the set of base stations or the set of channels,
    a manner of use of the aerial vehicle,
    a quality of service level associated with an account of the aerial vehicle, or
    a location of the aerial vehicle.

11. The non-transitory computer-readable medium of claim 8, where the one or more instructions, when executed by the one or more processors, further cause the one or more processors to:
  determine whether to activate a first set of antennas associated with the set of base stations or to deactivate a second set of antennas associated with the set of base stations based on a quantity of aerial vehicles using the set of base stations or the set of channels; and
  where the one or more instructions, that cause the one or more processors to perform the action, cause the one or more processors to:
    provide another set of instructions to the set of base stations to activate the first set of antennas or to deactivate the second set of antennas based on determining whether to activate the first set of antennas or to deactivate the second set of antennas.

12. The non-transitory computer-readable medium of claim 8, where the one or more instructions, when executed by the one or more processors, further cause the one or more processors to:
  determine whether the aerial vehicle is in a location; and
  where the one or more instructions, that cause the one or more processors to determine the base station and the channel, cause the one or more processors to:
    determine the base station and the channel based on the aerial vehicle being in the location.

13. The non-transitory computer-readable medium of claim 8, where the one or more instructions, when executed by the one or more processors, further cause the one or more processors to:
  determine a manner of use of the aerial vehicle; and
  where the one or more instructions, that cause the one or more processors to determine the base station and the channel, cause the one or more processors to:
    determine the base station and the channel based on the manner of use of the aerial vehicle.

14. A method, comprising:
  receiving, by a device and from an aerial vehicle, information related to the aerial vehicle,
    the information including:
      altitude information, and
      global positioning system (GPS) information, and
    the information to be used by the device to manage use of an aerial radio frequency (RF) signal by multiple aerial vehicles including the aerial vehicle;
  determining, by the device, other information related to the aerial vehicle based on the information;
  determining, by the device and using the GPS information, a base station, of a set of base stations, and a channel, of a set of channels associated with the base station, the aerial vehicle is to use to communicate based on the information,
    each of the set of channels having a different beam width, of a set of beam widths,
      the set of beam widths including a narrow beam width and a wide beam width,
        the narrow beam width to be used by the aerial vehicle at a high altitude, and
        the wide beam width to be used by the aerial vehicle at a low altitude,
    different channels, of the set of channels, to be used by the aerial vehicle at different altitudes,
    the set of channels including a first channel and a second channel, and
    the aerial vehicle using the first channel at a first altitude and the second channel at a second altitude;

providing, by the device, a set of instructions to the aerial vehicle to cause the aerial vehicle to use the base station or the channel to communicate based on determining the base station and the channel; and performing, by the device, an action other than providing the set of instructions to the aerial vehicle.

15. The method of claim 14, further comprising:

determining whether a value for a measurement related to the aerial RF signal received by the aerial vehicle satisfies a threshold after providing the set of instructions to the aerial vehicle; and determining another base station or another channel the aerial vehicle is to use based on the value of the measurement failing to satisfy the threshold.

16. The method of claim 14, further comprising:

determining whether the aerial vehicle is to use the aerial RF signal or a terrestrial RF signal; and where providing the set of instructions comprises:

providing the set of instructions to cause the aerial vehicle to use the aerial RF signal or the terrestrial RF signal based on determining whether the aerial vehicle is to use the aerial RF signal or the terrestrial RF signal.

17. The method of claim 14, further comprising:

determining a historical demand or a predicted demand for the aerial RF signal; and where determining the base station and the channel comprises:

determining the base station and the channel based on the historical demand or the predicted demand for the aerial RF signal.

18. The method of claim 14, further comprising:

determining a manner of use of the aerial vehicle based on the information received from the aerial vehicle; and where determining the base station and the channel comprises:

determining the base station and the channel based on the manner of use of the aerial vehicle.

19. The non-transitory computer-readable medium of claim 8, where the one or more instructions, when executed by the one or more processors, further cause the one or more processors to:

determine whether a value for a measurement related to the aerial RF signal received by the aerial vehicle satisfies a threshold after providing the set of instructions to the aerial vehicle; and determine another base station or another channel the aerial vehicle is to use based on the value of the measurement failing to satisfy the threshold.

20. The method of claim 14, where providing the set of instructions comprises:

providing the set of instructions to cause the aerial vehicle to modify at least one of an altitude of the aerial vehicle, a speed of travel of the aerial vehicle, or a direction of travel of the aerial vehicle.

* * * * *